United States Patent [19]

Dirtoft

[11] Patent Number: 4,987,545
[45] Date of Patent: Jan. 22, 1991

[54] METHOD FOR MONITORING THE MANUFACTURE OF A PRODUCT

[76] Inventor: Ingegerd Dirtoft, Eriksbergsgatan 38, S-114 30 Stockholm, Sweden

[21] Appl. No.: 267,467

[22] PCT Filed: May 12, 1987

[86] PCT No.: PCT/SE87/00232
§ 371 Date: Nov. 2, 1988
§ 102(e) Date: Nov. 2, 1988

[87] PCT Pub. No.: WO87/07363
PCT Pub. Date: Dec. 3, 1987

[30] Foreign Application Priority Data
May 20, 1986 [SE] Sweden ............................... 8602266

[51] Int. Cl.$^5$ .............................................. G01B 9/02
[52] U.S. Cl. ..................................... 364/468; 356/347
[58] Field of Search ................... 364/468, 474.37, 525; 356/347, 348

[56] References Cited

U.S. PATENT DOCUMENTS

| | | | |
|---|---|---|---|
| 3,911,733 | 10/1975 | Bhuta et al. | 356/347 |
| 3,934,461 | 1/1976 | Heflinger et al. | 356/347 |
| 3,938,889 | 2/1976 | McKinnis | 356/347 |
| 4,304,458 | 12/1981 | Huignard et al. | 356/347 |
| 4,464,052 | 8/1984 | Neumann | 356/347 |

Primary Examiner—Allen R. MacDonald
Attorney, Agent, or Firm—Sughrue, Mion, Zinn, Macpeak and Seas

[57] ABSTRACT

A method for monitoring a product under manufacture for possible deformation or changes in shape. In accordance with the method there is produced at given time intervals a series of halographic product images from which the rate at which possible changes in deformation take place in time can be estimated or evaluated. These estimated values relating to the rate of deformation and the rate of progressive changes therein are extrapolated so as to obtain the final value of the deformation of the product in relation to the state or form of the product immediately subsequent to the time of its manufacture. The process of manufacture is controlled on the basis of this final value, and the product is preferably cooled forcibly prior to producing the series of images.

3 Claims, 1 Drawing Sheet

METHOD FOR MONITORING THE MANUFACTURE OF A PRODUCT

TECHNICAL FIELD

The present invention relates to a method for monitoring the manufacture of a product, and more specifically, although not exclusively, for monitoring the possible occurrence of undesirable changes in shape or deformation of a manufactured product.

BACKGROUND PRIOR ART

The problem of estimating or measuring the change in shape, or deformation, of a manufactured product is one of a general character. There is today a general need to estimate or measure the change in shape or deformation of a product under manufacture, so that when carrying out prototype checks it is possible to anticipate what constructional changes, e.g. tool changes, will be needed and so that when carrying out production checks (quality checks) the need for taking rectifying measures, e.g. tool replacement because of worn tools, can be both observed and put into effect at an early stage, thereby greatly reducing the number of faulty goods which need to be rejected, if not avoiding the occurrence of rejects altogether, particularly when the product is manufactured in large numbers.

The problem of measuring or estimating the deformation or change in shape of a product is particularly prevalent in products produced from polymeric materials, due to the anisothropic properties of the injection moulded products; even though measurements are taken at given points, no definite knowledge can be obtained of the circumstances prevailing at the points therebetween. In addition, because the material is resilient it can readily be deformed or blemished by contact with gauges, templates, measuring probes etc., when the product is measured for distortion by means of a conventional contact method. Certain products are used normally in a humid atmosphere, and hence the lack of a practical method of measuring moist products is a distinct disadvantage.

SUMMARY OF THE INVENTION

The object of the present invention is to eliminate these drawbacks. Accordingly, the present invention consists in a method for monitoring the occurrence of possible changes in shape of a manufactured product, comprising producing a series of images of the product at pre-determined intervals of time, by means of holographic measuring apparatus, in a manner such that the images at each imaging time point are representative of possible deformation in the product in relation to the immediately preceding imaging moment; evaluating the rate at which such deformation occurs in time, from the images thus produced; and extrapolating the values relating to the rate of deformation so as to obtain the final value of the deformation of the product relative to the form or state of the product immediately subsequent to the time of its manufacture.

These and other features of the inventive method are set forth in the following claims.

BRIEF DESCRIPTION OF THE DRAWINGS

The invention will now be described in more detail with reference to the accompanying drawing, in which.

DETAILED DESCRIPTION OF A PREFERRED EMBODIMENT

When developing and manufacturing new plastic products it is preferable to obtain, as early as the prototype stage, an understanding of how the new product will behave after leaving, e.g., the injection moulding tool; this is necessary in order to make at an early stage those constructional changes required in order to avoid the occurrence of rejects further on in the manufacturing chain, such rejects being caused for example by unacceptable distortion of the product, stress concentration in the product material, etc.

To this end the product is first cooled rapidly to normal room temperature, which can be effected in approximately 10 minutes. A series of images of the product, or optionally a specific part thereof, are then produced at predetermined time intervals with the aid of holographic measuring apparatus. In this regard an exposure is first made at a time point t, whereafter a further exposure is made at the same location after a given lapse of time $\Delta t$. If the product has been deformed slightly during this lapse of time $\Delta t$, this will be shown on the exposed plate in the form of a number of straight or slightly curved lines, the number of lines that appear and their thickness constituting a measurement of the extent to which the product has been deformed or deviates from its true form. The configuration in which the lines appear on the plate will, as a result of experience, divulge certain information as to the reason why deformation has occurred. The final value of the deformation to which a product is subjected in relation to the form or state of the product immediately subsequent to the time of its manufacture can be evaluated or established on the basis of a number of such images. Thus it is possible, in this way, to establish whether the product can be accepted or whether the injection moulding tool should be re-constructed or otherwise modified in order for the product to meet with set requirements, e.g. such requirements as smoothness, dimensions, density, and like parameters.

When conditions are considered sufficiently satisfactory for manufacture of the product to commence, the method according to the invention can be used to monitor and control the manufacturing process. The process is thus controlled on the basis of said final value of product deformation or distortion. Since the method can be executed very quickly, it is possible to make changes in the process at an earlier stage, should faults be observed. It is possible that these changes may necessitate temporary stoppages in the process, for adjustment to process parameters or to make tool changes. However, since the continuous monitoring of the product will have indicated the changes that are taking place, it is possible to take precautionary measures at an earlier stage, e.g. the procurement of a new tool, and hence the stoppages need not be unexpected or of long duration.

Figure 1:
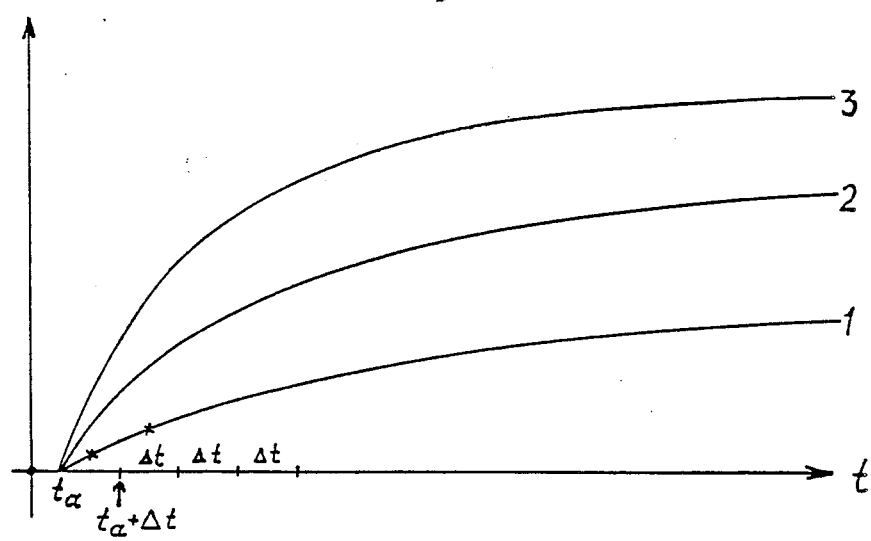
FIG. 1 illustrates a number of curves showing the rate of progressive deformation of a product as a function of time (e.g. warping, shrinkage)

The diagram of FIG. 1 shows three curves which are assumed to have been obtained when plotting the rate of deformation SK, or change in shape, as a function of the time t for a given manufacturing process in the manufacture of a plastic product. In this case it is assumed that the product comprises the lid or cover of a liquid tank on which certain requirements are placed with regard to density, pressure resistance, etc. It is also assumed that the product has been cooled to normal room temperature at time $t_a$, at which time a first exposure was made with the aid of holographic measuring apparatus, and that a further exposure was made at a time $t_a + \Delta t$ ($\Delta t = 10$ mins), the first and second exposures providing the first image, and that a third exposure was then made, these exposures being made in quick succession. The number of lines appearing on the image is a measurement of the rate at which deformation takes place. This number, e.g. 10 lines, is then representative of the first time interval $t_a - (t_a + \Delta t)$ and is plotted suitably at the midway point of said interval. Approximately at time point $t_a + 2\Delta t$, a fourth and a fifth exposure are made, on a new plate, in quick succession, the fourth and third exposures providing the second image. The number of lines appearing on the second image, perhaps 8, is added to the number of lines (10) on the first image and the sum obtained is plotted at the midway point of the second time interval, this procedure being repeated for as long as necessary.

At another, later stage there is obtained a curve 2 which lies substantially above the curve 1 and which indicates some discrepency or fault in the manufacturing process. The curve in the illustrated case, however, represents a borderline case and the product can still be accepted. However, the curve also indicates that measures must be taken to eliminate the source of error in the process. If such measures are not taken, there is a distinct danger that the product concerned will be found unacceptable and that manufacture must be stopped. A clear example of this is shown by the curve 3, which indicates pronounced deformation of the product, resulting in rejection. Thus, discrepencies and faults occurring in the manufacturing process are indicated by the present invention at a much earlier stage of the process than is possible with prior art monitoring methods, therewith eliminating the risk of subsequent rejects.

The key diagram obtained when practicing the method according to the invention not only makes it possible to ascertain that a product is distorted, etc., but also enables the extent of this distortion to be established (the number of lines), together with its location and, at times, the cause (the directions in which the lines extend and the pattern which they form).

At times, e.g. when carrying out manufacturing checks, it can be seen immediately, e.g. after only one or two images have been produced (2 to 4 exposures) that a product is unacceptable, in which case the monitoring process is stopped immediately, i.e the work entailed in producing the complete curves of the FIG. 1 illustration is not undertaken. In other cases it may be beneficial to observe how the product "behaves" over a long period of time, e.g. so as to obtain therewith a basis for constructional measures that need be taken.

Figure 2:
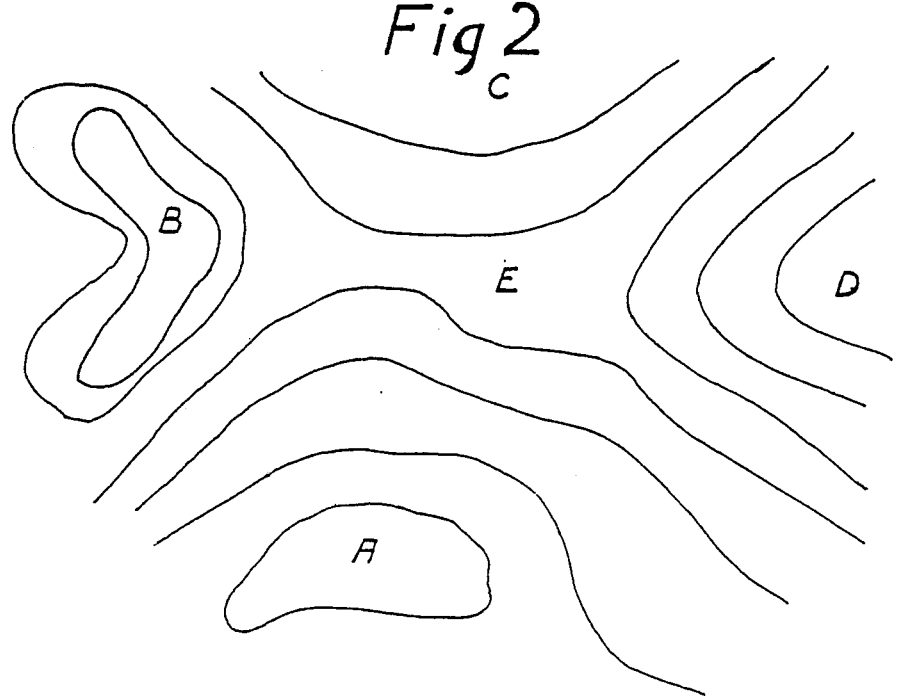
FIG. 2 illustrates the interference pattern of a hologram produced from a plastic product.

The hologram shown in FIG. 2 illustrates the interference pattern obtained with a plastic product that has suffered substantial deformation. Together the contour lines produce a saddle-configuration with altitudes at points A, B, C, D and a part at point E. A large number of lines indicates radical changes. A routined interpretor of such interference patterns is able to obtain from the number of lines present, their thickness and their curvature, valuable information concerning weaknesses in a construction, and is therewith made aware indirectly of the constructional changes that need to be made in order to rectify the fault.

In addition to providing a total picture of the sequence in which deformation occurs, thus not only at one or a few locations in the process, the method according to the invention has the further advantage of being usable on products which, e.g. are under tension, for instance in conjunction with load tolerance tests, or which are submersed in water, e.g. in conjunction with product function tests, or on products which are located in environments of varying temperatures, which means that the product can be monitored with the product in its true context and relatively independent of the more or less complex form of the product and its possible variation in thickness. The invention also enables a study to be made of those parts of a product or object which are of particular interest for some reason or another. This, of course, further enhances the possibility of anticipating weaknesses in novel constructions and those modifications which might be necessary during the process of manufacture.

I claim:

1. A method for monitoring the manufacture of a product to detect the possible occurrence of deformation in the shape of the product, comprising the steps of: producing a series of holographic images of the product under manufacture at predetermined, spaced time intervals ($\Delta t$, $2\Delta t$, etc.) such that said images, at successive imaging time points ($t_a + \Delta t$, $t_a + 2\Delta t$....) are representative of deformations occurring in the shape of the product relative to respective immediately preceding imaging time points ($t_a$, $t_a + \Delta t$....); determining, from the images thus produced, the rate of change of said deformations; and extrapolating determined values relating to the rate of change of deformations to obtain an estimation of a final shape of the product in relation to the shape of said product immediately following its manufacture.

2. A method according to claim 1, further comprising:
   (a) making two holographic images of the product at each time interval,
   (b) combining one of said two images with an immediately preceding image, and
   (c) combining another of said two images with an immediately following image.

3. A method according to claims 1 or 2, further comprising forcibly cooling the product to normal room temperature prior to producing said series of images.

* * * * *